United States Patent [19]

Heiserman

[11] Patent Number: 4,666,198
[45] Date of Patent: May 19, 1987

[54] PIEZOELECTRIC POLYMER MICROGRIPPER

[75] Inventor: David L. Heiserman, Columbus, Ohio

[73] Assignee: Microflex Technology, Inc., Columbus, Ohio

[21] Appl. No.: 823,011

[22] Filed: Jan. 27, 1986

Related U.S. Application Data

[63] Continuation-in-part of Ser. No. 647,722, Sep. 6, 1984, Pat. No. 4,610,475.

[51] Int. Cl.[4] ............................................. B25J 15/12
[52] U.S. Cl. .................................... 294/86.4; 294/118; 901/36
[58] Field of Search ................ 294/1.1, 86.4, 88, 99.1, 294/104, 106, 115, 118, 119.3, 902, 906, 907; 310/25, 330–332, 370, 800; 414/729, 730, 744 A, 751; 901/30–36, 38–40, 45, 46, 50

[56] References Cited

U.S. PATENT DOCUMENTS

| 3,726,557 | 4/1973 | Ventre | 294/86.4 |
| 3,835,338 | 9/1974 | Martin | 310/331 |
| 4,108,486 | 8/1978 | Hirmann | 294/86.4 |
| 4,342,936 | 8/1982 | Marcus et al. | 310/330 |
| 4,400,642 | 8/1983 | Kiraly | 310/332 |

FOREIGN PATENT DOCUMENTS

| 2241483 | 3/1975 | France | 294/86.4 |
| 862174 | 3/1961 | United Kingdom | 294/86.4 |
| 773715 | 10/1980 | U.S.S.R. | 310/370 |
| 867646 | 9/1981 | U.S.S.R. | 294/907 |
| 867647 | 9/1981 | U.S.S.R. | 294/86.4 |

Primary Examiner—Johnny D. Cherry
Attorney, Agent, or Firm—Frank H. Foster

[57] ABSTRACT

Improved microgrippers using piezoelectric polymers are disclosed utilizing a pair of levers formed in a plier-like structure having piezoelectric polymer composite sheets connected between the levers or between each lever and a third intermediate lever or through a drive linkage to the levers. By appropriate application of electric fields, jaws formed at the ends of the levers are moved toward and away from each other to accomplish the grasping and releasing action.

19 Claims, 30 Drawing Figures

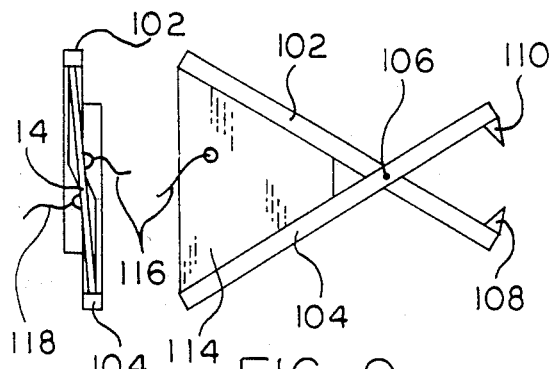
FIG. 8
FIG. 9
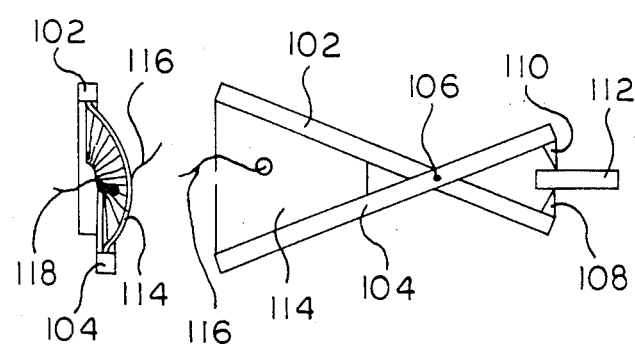
FIG. 10
FIG. 11
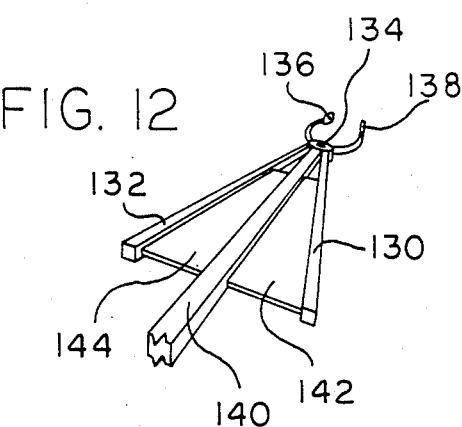
FIG. 12
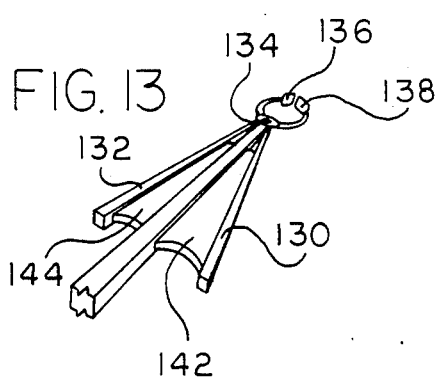
FIG. 13
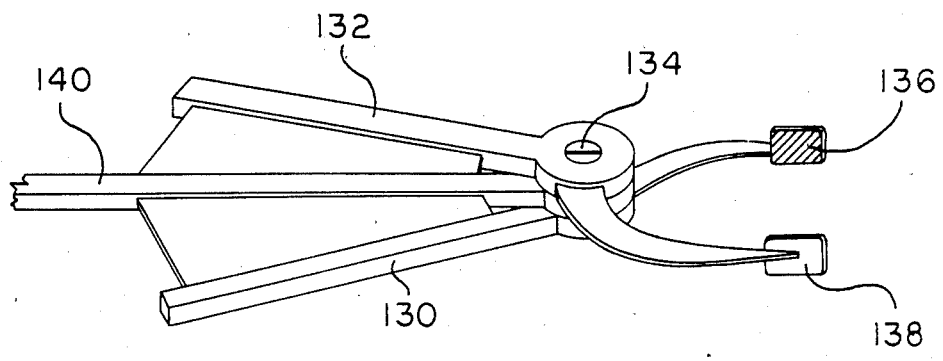
FIG. 14

PIEZOELECTRIC POLYMER MICROGRIPPER

This application is a continuation-in-part of my copending application, Ser. No. 647,722, filed on Sept. 6, 1984, now U.S. Pat. No. 4,610,475.

This invention relates generally to mechanized tools for handling parts and materials in the fabrication of products and more particularly relates to a grasping manipulator for use in microfabrication and assembly and other grasping and manipulating of very small parts and materials. A micromanipulator embodying the present invention is also useful in medical applications, such as microscopic surgery and in scientific experiments in which remote control of a manipulator is needed, such as the manipulation of small biological samples.

BACKGROUND ART

Remotely controlled manipulators are used for grasping, moving and positioning a variety of objects from a remote position. The manipulator may be manually controlled or controlled by a machine, such as modern data processing apparatus. Such manipulators are used, for example, in modern robot aided manufacturing and assembly procedures and in handling dangerous materials. Typically, the manipulators are mechanical devices utilizing levers, pivots, gears and other mechanical structure to provide a variety of gripping structures referred to in this patent collectively as jaws. Because they are mechanical devices, such manipulators require lubrication and cleaning and are subject to wear.

Wherever the manufacturing process, such as the manufacture of electronic equipment, requires the manipulation of very small parts, the mechanical manipulators are particularly expensive because they require the shaping, machining and assembly of extremely small components. These manipulators therefore have a tendency to be more expensive, complicated and difficult to manufacture, assemble and maintain than is desirable.

Additionally, there is a practical limit to the miniaturization of mechanical structures. These size limitations on the manufacture of mechanical manipulators limits the size of the parts which they are able to handle.

There is, therefore, a need for a manipulator which is considerably more simple and inexpensive to manufacture and assemble and is easily operated and controlled without the extensive maintenance requirements of mechanical manipulators and which can be used for the manipulator of even smaller parts.

Electrically stimulated piezoelectric polymers have been used in the past in a vibrating mode in audio speakers and headphones. In such devices two layers of piezoelectric polymer are bonded together and are mechanically linked to a diaphragm. They are driven by an audio signal voltage.

BRIEF SUMMARY OF THE INVENTION

In the invention of the above parent application at least one of the two or more jaw members of a manipulator comprises a piezoelectric polymer and a means for applying an electric field to the polymer and for controlling the field. Preferably, each of the jaws comprises a pair of elongated ribbons of piezoelectric polymer bonded together along interfacing major surfaces and in oppositely polarized orientations to form a cantilever. An electrically conductive film is bonded to the outwardly facing major surfaces of each laminated cantilever and a voltage source is connected to the conductive films of each jaw for applying a potential across them to create the electric field. The application of a voltage source to the conductive films causes the cantilevers to bend toward or away from each other to grip a small object.

This continuation-in-part application is directed to devices in which the piezoelectric polymer is linked to levers, such as a pliers-like structure, in a configuration which causes the levers to move and grasp and then release an object upon the bending and then the return or unbending of the piezoelectric polymer sheet.

Embodiments of the invention may be used to provide a gripping manipulator in a microscopic environment. The gripper may be equipped with a television system and so equipped can be used in clean room microassembly fabrication, the vacuum chambers of electron microscopes and with biological samples in experiments conducted on orbiting satellites, all by remote control. With the appropriate tools, embodiments of the invention may also be used for microscopic welding and surgical applications, although the concepts of the present invention are not intended to be limited to microscopic and miniature environments.

An advantage of utilizing embodiments of the invention in which the piezoelectric polymer sheets act upon levers is that this permits the piezoelectric sheets to be electrically isolated and mechanically housed in order to protect the devices from the environment and also to insulate people from electrical shock hazard. Additionally, the levers provide mechanical advantage.

BRIEF DESCRIPTION OF THE DRAWINGS

FIGS. 8-11 represent a simple preferred embodiment of the invention in which FIG. 8 is an end view and FIG. 9 a plan view of the embodiment in its opened or release position and FIG. 10 is an end view and FIG. 11 a plan view of the embodiment of FIGS. 8 and 9 in its closed or gripping position.

FIGS. 12 and 13 are views in perspective of an alternative embodiment of the invention having a central, relatively stationary support, FIG. 12 showing the alternative embodiment in its release position and FIG. 13 showing it in its gripping position.

FIG. 14 is a detailed view in perspective of a portion of the embodiment of FIGS. 12 and 13.

Figure 1:
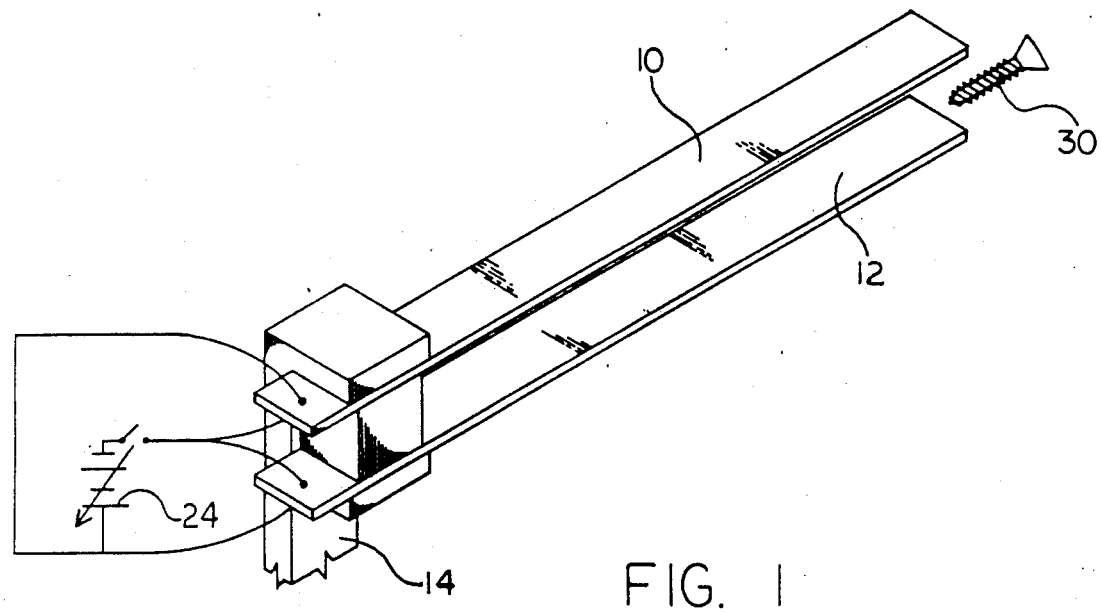
FIG. 1 is a view in perspective illustrating a preferred embodiment of the invention in the parent application in its relaxed, release position.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

A variety of polymers can be made to exhibit piezoelectric properties and others will become known in the future as a result of research. The preferred material utilized in embodiments of the present invention is polyvinylidene difluoride. Although this material is available from several manufacturers, one manufacturer sells it under the trademark Kynar. The piezoelectric polymers which are chosen require suitable mechanical, piezoelectric and thermal properties. They must be sufficiently strong and durable, be able to withstand the temperatures of the environment in which they must work and must be easily fabricated into the geometrical configurations which are required. Piezoelectric polymers are described by M. Toda in *Transactions IECE of Japan*, 61, and 7 (1978). A brief summary of their preparation and operation is useful.

Although the characteristics of piezoelectric polymers have been previously described in the prior art, a polymer which is capable of exhibiting piezoelectric properties is prepared by stretching it to form a film while simultaneously subjecting it to an electric field. The electric field is oriented transversely through the major surfaces of the film. This causes an average net rotation of molecular dipoles within the material with the dipoles being rotated toward alignment with the electric field.

Thereafter, when a sheet of this material is subjected to an electric field transversely and preferably perpendicularly through its major surfaces, the dipoles tend to be rotated. This rotation causes a strain to occur principally along the stretch direction. If the later field which is used to control the strain is in the same direction as the field utilized to initially align the dipoles, then the material is shortened. If the field is opposed to the initial poling field, then it is opposed to the existing dipoles and causes an elongation strain in the direction of stretch.

The controlling electric field may be most conveniently applied by forming a conductive film on each of the exposed, opposite major surfaces of the piezoelectric polymer. This is conveniently done by depositing a metalized surface of nickel or aluminum, for example, on those major surfaces. If the film is purchased with metalized surfaces, two ribbons of film may be bonded together with the metalized surfaces still on both major surfaces of each ribbon. The outer two metalized layers are the electrodes while the interior, bonded surface layers are inactive. Since they are preferably not ferromagnetic, they do not effect the electric field.

Figure 2:
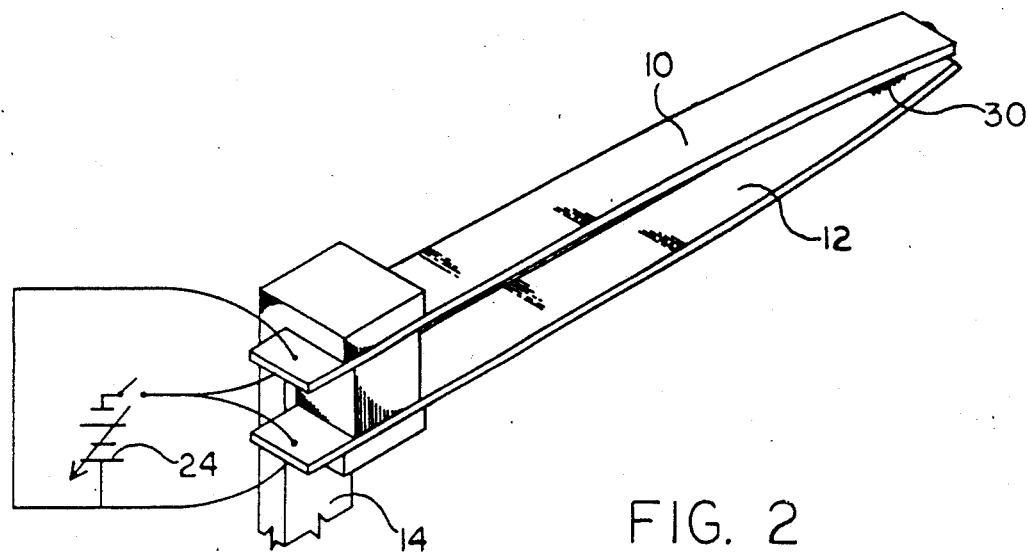
FIG. 2 is a view in perspective of the embodiment of the invention illustrated in FIG. 1, but operated for grasping a small part.
Figure 3:
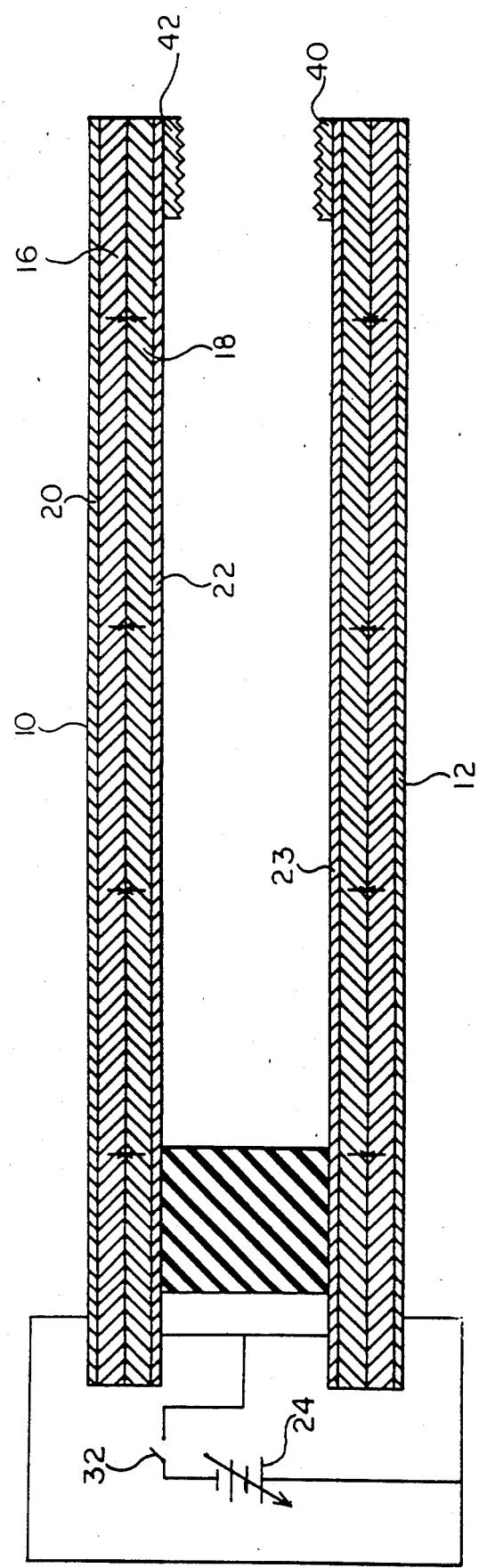
FIG. 3 is a view in vertical section of the embodiment of FIG. 1 with disproportionately enlarged dimensions to illustrate the component parts of the embodiment of FIG. 1.

FIGS. 1, 2 and 3 illustrate a preferred embodiment of the invention in the parent application. This preferred embodiment comprises a pair of jaw members 10 and 12 which are mounted to a support 14. Preferably, both of the jaws comprise flexible cantilevers formed of ribbons of piezoelectric polymers. The cantilevers are elongated in the "stretch" direction of the polymer and extend from the support 14 in substantially the same direction. They are spaced from each other and each cantilever has a major surface facing a major surface of the other.

Referring to FIG. 3 and jaw 10 for example, each of the cantilever jaw members preferably comprises a laminate which is a pair of piezoelectric polymer ribbons 16 and 18 which are bonded together along their longitudinally extending interfacing major surfaces. Preferably, as indicated by the direction of the small arrows, they are oriented so that their dipoles are oppositely polarized. Although not necessary, they may for some applications have different piezoelectric coefficients.

Electrically conductive films 20 and 22, are bonded to the outwardly facing major surfaces of the piezoelectric polymer ribbons 16 and 18. The polymers may be metalized by depositing thin films of metal on their exposed major surfaces by standard metalization techniques. These conductive surfaces are connected by electrical conductors to a variable voltage source 24. The conductive surfaces together with the variable voltage source and connections between them provide a means for applying an electric field to the piezoelectric polymers and for controlling that field. Although a simple on/off control may be used, preferably, in some applications, the control may also vary the magnitude of the potential and therefore the electric field and may also permit polarity reversal.

In the operation of the embodiment illustrated in FIGS. 1-3, application of a voltage of the polarity illustrated causes a strain in the piezoelectric polymer ribbons. Each ribbon which has its dipoles in the polarity of the applied electric field will shorten in length while each ribbon with its dipoles opposite to the applied electric field will lengthen. This will cause each of the cantilever jaws illustrated in FIG. 3 to bend toward each other so that they may grip an object, such as the small object 30 illustrated in FIGS. 1 and 2. Upon removal of the electric field by opening the switch 32 the cantilever jaws will relax back to the position illustrated in FIGS. 1 and 3.

The cantilever jaws are conveniently made to bend toward each other, when the interfacing central conductive layers 22 and 23 are in contact with the same battery electrode, by orienting the jaws so that their piezoelectric polymer ribbons which face each other are oppositely polarized. Of course, one of the two cantilever jaws could be inverted and the electrical connections maintained the same to provide identical operation.

The jaws of each gripper can be provided with a suitable tool formed, for example, in the embodiment of FIGS. 1-3 at the end of the cantilevers. FIG. 3 illustrates a pair of pads 42 and 44 having centrally facing serrated surfaces for gripping a workpiece. The tools may be of any material and configuration which is suitable and known in the art for gripping a workpiece.

Embodiments of the invention may be formulated with a variety of alternative structures. For example, a gripping and releasing structure may be formed in which only one of the jaws is constructed of piezoelectric polymers while the other is merely a passive jaw but is positioned as illustrated in FIGS. 1-3. In such a gripper, the active piezoelectric polymer cantilever moves toward and away from the passive jaw in response to the electric field applied to it.

The jaw members formed in accordance with the present invention may be formed in a variety of configurations, each of which is suitable for the particular environment in which it is to operate and for its particular task.

Figure 4:
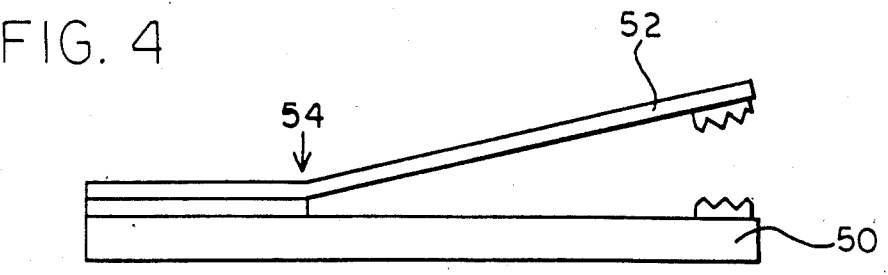
FIGS. 4, 5 and 6 illustrate alternative embodiments of the invention of the parent application.

For example, FIG. 4 illustrates a gripper which has a passive cantilever jaw member 50 and a piezoelectric polymeric jaw member 52 which is identical to the jaw member 10 of FIG. 3, except that it is predistorted with a bend 54 so that, when no electric field is applied to it, it relaxes to the position illustrated in FIG. 4. Application of a voltage of the appropriate polarity to its conductive layers will cause the jaw to close upon an object positioned between the jaw member 50 and the jaw member 52.

Figure 5:
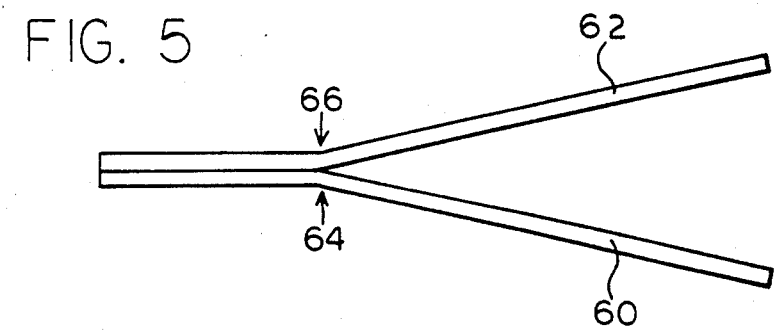

In the embodiment of FIG. 5 there are two active piezoelectric polymeric jaw members 60 and 62 which are identical to those of FIG. 3, except that both are provided with a bend, 64 and 66, so that the resulting gripper is Y or yoke-shaped.

Figure 6:
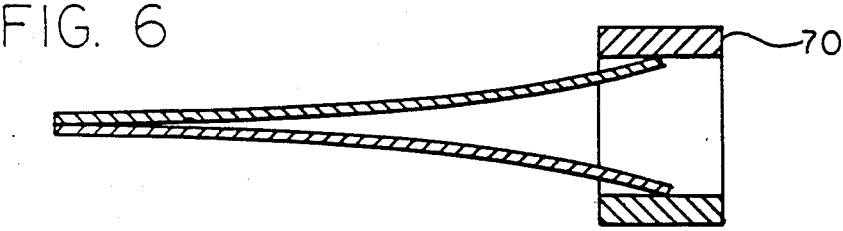

FIG. 6 illustrates yet another alternative embodiment in which the cantilever jaw members are substantially identical to the jaw members of FIG. 3, except that a voltage of the opposite polarity is applied so that the jaw members move apart upon application of the voltage to grip the inside of a workpiece 70.

Jaw members may be formed with ribbons which have a tapered or otherwise varying thickness so that, when they are bonded together, they have a varying curvature along their length.

Since application of the field causes a strain in the longitudinal direction of the ribbon, a gripper may also be formed using single layer piezoelectric polymers and not having a bending movement. The single layer pieces are arranged in line so that they extend toward each other with a gap between them. Upon application of an electric field the pieces elongate toward each other to grip an object positioned in the gap.

Thus, it should be apparent that in the broadest sense of the invention, a piezoelectric polymer member is subjected to an electric field causing it to physically move either toward or away from another member. This movement with respect to another member can be utilized to grip the inside or outside of a workpiece. Most desirably, all of the members may be piezoelectric polymers so both will move in order to increase the total movement distance of the jaw members.

Figure 7:
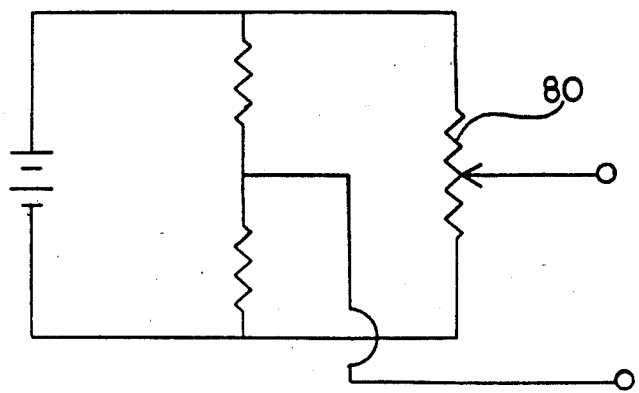
FIG. 7 is a schematic diagram of a simple power supply circuit for controlling the magnitude and polarity of the electric field.

FIG. 7 illustrates a simple bridge circuit which may advantageously be used to provide the voltage to embodiments of the present invention. It has the advantage that movement of the potentiometer 80 permits the magnitude and the polarity of the applied electric field to be varied.

In addition, cantilever jaw members or jaw members of other types and configurations may be formed of a laminate of several layers of piezoelectric polymers. In addition the layers of a multilayer jaw may have differing piezoelectric constants.

Engineering

The equation for calculating the elongation of a single layer of piezoelectric polymeric material formed in a ribbon, as described above, is:

$$L = d_{31} VL/t \qquad \text{I}$$

wherein
  $d_{31}$ = the piezoelectric strain constant
  V = applied voltage
  L = Length
  t = thickness of ribbon
  L = change in length The force applied by the strain of the above relationship is:

$$F = Y d_{31} wV$$

wherein
  Y = Young's modulus
  w = width other variables are as above

The lateral displacement of a single cantilever jaw member, such as jaw member 10 illustrated in FIG. 3, is given by the equation:

$$D = 3 d_{31} L^2 v / 4 t^2 \qquad \text{III}$$

Where two cantilever jaw members are utilized, as illustrated in FIG. 3, the total distance change between the two at the tips is twice the above distance.

The force applied by a single jaw member of the type illustrated in FIG. 3 is:

$$F = 3 Y d_{31} wtV/2L \qquad \text{IV}$$

EXAMPLE

An experimental example of the embodiment illustrated in FIG. 3 was constructed. The length of each jaw member was 20 mm and its width was 5 mm. Each ribbon was 28 microns thick. A voltage of 40 volts was applied. Each jaw member exhibited a tip displacement of about 0.35 mm and a predicted force of 1.9 mg.

Improvements Using Mechanical Linkages

From the above description it can be seen that a laminated, flexible sheet having at least two flexible layers which are bonded together can be constructed so that the application of a voltage will cause the sheet to bend if at least one of the layers is a piezoelectric polymer layer. While the other layer could be a passive sheet the dimension of which does not change in the "stretch" direction when subjected to an electric field, greater movement and more efficiency is accomplished by using two oppositely polarized layers of the piezoelectric polymer to form a laminated sheet in the manner described above.

The laminated sheet may be linked to levers in order to obtain a mechanical advantage or accommodate different grasping and releasing needs. Desirably, the levers may be formed as a plier-like structure with the laminated sheet of piezoelectric polymers configured to optimize the work done by the laminated piezoelectric sheet when the electric field is applied and removed or applied in the opposite direction. There are, of course, a great variety of embodiments which this invention may take, some of which are represented in FIGS. 8 through 30.

Referring, for example, to FIGS. 8-11, a pair of levers, 102 and 104, are relatively pivotable about a fulcrum 106, formed by a suitable pivot pin. The opposed ends of each lever are formed into jaw portions 108 and 110 respectively. These jaw portions 108 and 110 are movable relatively nearer and farther from each other for grasping and releasing an object, such as the object 112. In this embodiment, the laminated sheet, which includes the active piezoelectric polymer layer, preferably comprises two piezoelectric polymer layers which are bonded together so that they are oppositely polarized. As in the manner described above, a pair of electrically conductive, flexible films are bonded to the exterior surface of the laminated sheet and are electrically insulated from each other to form a composite sheet 114. An electric field is then created between these conductive films by applying a controllable DC voltage source to conductors 116 and 118 which are connected to the conductive films.

The laminated flexible sheet 114 is trapezoidally shaped, extends directly between and is connected at its opposite edges to the two levers 102 and 104. The laminated sheet 114 may be constructed so that when the laminated sheet 114 is relaxed, it is in a planar configuration as illustrated in FIG. 9. Application of the electric field then causes the laminated sheet 114 to bend in accordance with the principles described above so that the levers move pivotally toward each other from the position illustrated in FIGS. 8 and 9 to the position illustrated in FIGS. 10 and 11. Of course, in this as in the other embodiments of the invention the piezoelectric flexible sheet 114 may alternatively be constructed so that when it is relaxed it is in the configuration illustrated in FIG. 11 and when an electric field is applied it flattens to the configuration of FIGS. 8 and 9. Additionally, as described above, instead of merely applying and removing an electric field, the field may be applied in one polarity and then in the alternative applied in the opposite polarity. This is preferred because it increases the total bending force and similarly can increase the total range of displacement of the lever arms. Thus, the laminated sheet may be constructed so that when polarized in one direction it is planar and when polarized in the opposite direction it has its maximum curvature to maximize the available displacement for the levers 102 and 104.

Additionally, it is also possible to bias the jaws to either the open, release position or the closed, gripping position by means of a separate biasing means, such as a spring. Alternatively, biasing may be accomplished by using the resilient or elastic character of the sheet. The sheet may be preconfigured to one shape so that it will then be moved to another configuration upon application of the appropriate electric field.

Although simple strips or rectangular sheets could be bridged directly between the opposite lever arms of the levers 102 and 104, I find that it is more efficient and effective to configure the composite sheet 114 in the form of a trapezoid. This should be constructed so that the "stretch" diretion of the piezoelectric polymer films is oriented to bridge across the levers in order to accomplish the displacement of the levers when the voltages are applied.

By forming the piezoelectric polymer composite sheets in a substantially trapezoidal configuration, all the bending forces of the sheet which result from application of the electric field are applied toward moving the levers instead of distorting the film. The portion of the composite sheet which is radially closer to the fulcrum moves through a shorter circumferential distance than a portion which is radially further from the fulcrum. Thus, more bending displacement is needed at radially greater distances from the fulcrum and the trapezoidal configuration seems to provide a correspondingly continual increase in the necessary bending displacement at radially greater distances.

FIGS. 12, 13 and 14 illustrate an alternative embodiment to the invention. It has a lever 130 and a lever 132 which are relatively pivoted to each other about a fulcrum 134. Lever 130 includes a jaw member 136 and the other lever 132 includes an opposed jaw member 138. The details of the fulcrum and pivot structure 134 and the jaw members 136 and 138 are illustrated in FIG. 14.

In addition, in this embodiment a relatively stationary support 140 extends between the levers 130 and 132 and is pivotally connected to the levers at the fulcrum 134. The laminated flexible sheet of this embodiment comprises a first laminated sheet 142 which is connected to and extends between the support 140 and the lever 130 and also a second laminated sheet 144 which is connected to and extends between the support 140 and the lever 132.

In the embodiments of FIGS. 12, 13 and 14 application of the electric field to the laminated sheets 142 and 144 causes them to move between the release position illustrated in FIG. 12 and the gripping position illustrated in FIG. 13.

Figure 15:
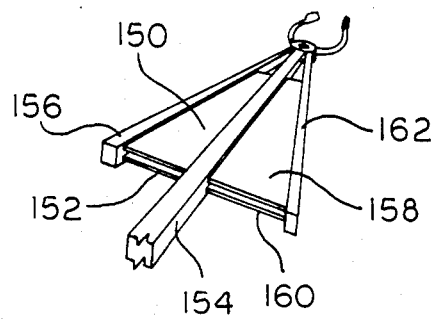
FIGS. 15 and 16 illustrate in perspective another alternative embodiment of the invention, FIG. 15 in the release position and FIG. 16 in the gripping position.
Figure 16:
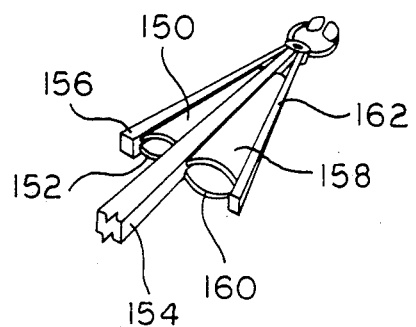

FIGS. 15 and 16 illustrate another alternative embodiment which is a modification of the embodiment illustrated in FIGS. 12-14. In the embodiment of FIGS. 15 and 16, instead of a single sheet, a plurality of laminated sheets, such as the two laminated sheets 150 and 152, are connected to and extend between the support 154 and one of the levers 156. Similarly, a plurality of laminated sheets, such as laminated sheets 158 and 160, are connected to and extend between the support 154 and the other lever 162.

As illustrated in FIG. 16 the parallel pairs of laminated sheets can be configured so that they distort or bend in opposite directions. Of course, more than two laminated sheets may be utilized in parallel and may be made to distort in a series of concentric arcs.

Figure 17:
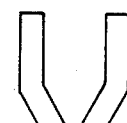
FIG. 17 is a diagrammatic view in side elevation of an alternative embodiment of the invention.

FIG. 17 illustrates yet another alternative embodiment of the invention in which one of the levers 170 is relatively stationary so that it may be connected to some other supporting structure, such as the chuck or collet of a robot arm. The other lever 172 is free to be moved by the laminated sheet 174 constructed as described above.

Figure 18:
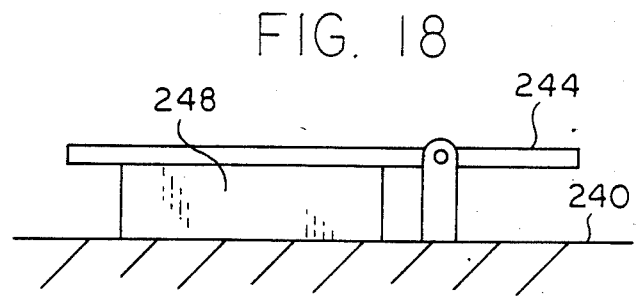
FIG. 18 is a diagrammatic view in side elevation of an alternative embodiment of the invention.
Figure 19:
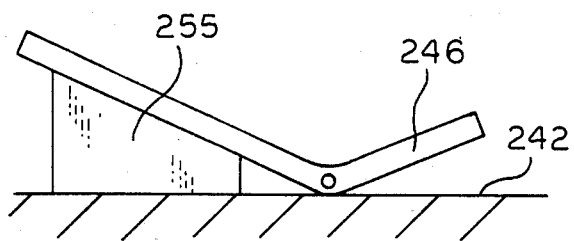
FIG. 19 is a diagrammatic view in side elevation of an alternative embodiment of the invention.

FIGS. 18 and 19 illustrate another embodiment in which one lever may be a solid or relatively stationary ground plane 240 or 242 to which the other lever 244 or 246 respectively is pivoted. The composite, piezoelectric, laminated sheets 248 and 255 are connected between the levers. FIG. 18 also illustrates that it is not necessary that a lever, such as the ground plane 240, be aligned along a radial of the fulcrum or pivot axis.

Figure 20:
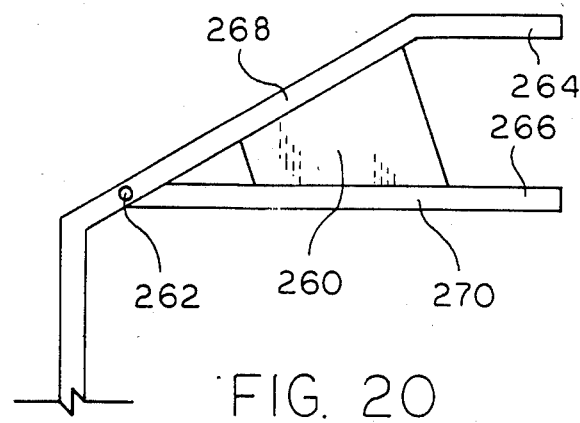
FIG. 20 is a diagrammatic view in side elevation of an alternative embodiment of the invention.

In the embodiments of FIGS. 8 through 19, the composite piezoelectric polymer sheet has been positioned on the opposite side of the fulcrum from the jaw portions of the levers. FIG. 20 illustrates an embodiment in which the composite sheet 260 is positioned on the same side of the fulcrum 262 as the jaw portions 264 and 266 of the levers 268 and 270. In the embodiment of FIG. 20 the lever 268 extends to other mounting apparatus such as a chuck or collet.

Figure 21:
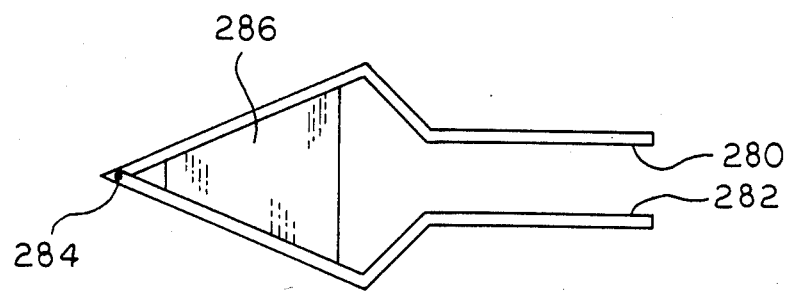
FIG. 21 is a diagrammatic view in side elevation of an alternative embodiment of the invention.

FIG. 21 is yet another embodiment with the jaw members 280 and 282 formed on the same side of the pivot or fulcrum 284 as the side which the composite piezoelectric polymer sheet 286 is attached.

Figure 22:
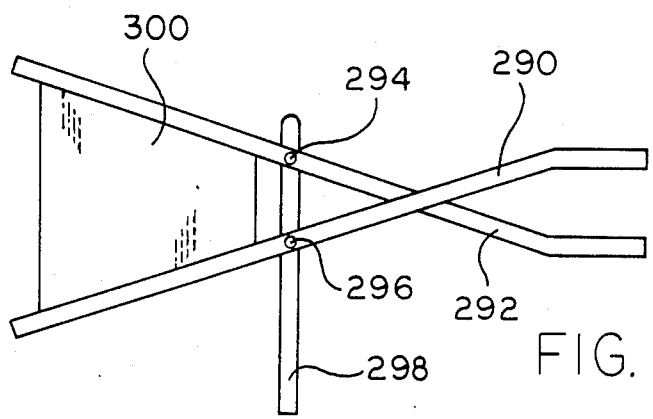
FIG. 22 is a diagrammatic view in side elevation of an alternative embodiment of the invention in its release state.

FIG. 22 illustrates an embodiment in which each lever arm 290 and 292 is pivoted to a different fulcrum 294 and 296 respectively. These fulcrums are formed by pivot pins which are connected to a support rod 298 which similarly may be connected to a robot arm or other supporting structure. The piezoelectric, polymer composite sheet 300 is connected in the manner described in connection with the other embodiments.

Figure 23:
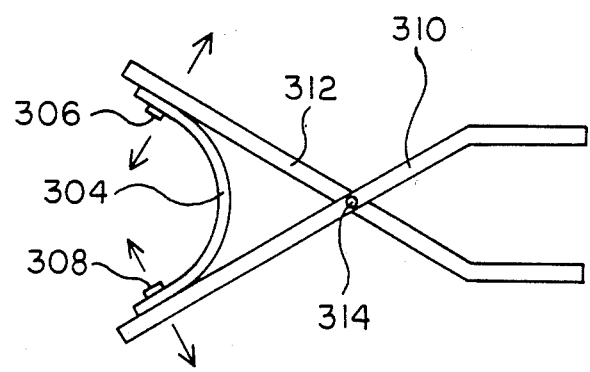
FIG. 23 is a diagrammatic view in side elevation of the embodiment of FIG. 22 in its gripping state.

FIG. 23 illustrates an embodiment in which the piezoelectric, polymer composite sheet 304 is shaped in an arcutate form as a bent ribbon attached at its ends 306 and 308 to the levers 310 and 312. The arcuate composite sheet 304 is aligned so that its linear elements, which are perpendicular to the plane of the illustration of FIG. 23, are substantially parallel to the axis of the fulcrum 314. In this manner the bending of the composite sheet 304 due to the influence of the electric field will pivot the levers 310 and 312.

Figure 24:
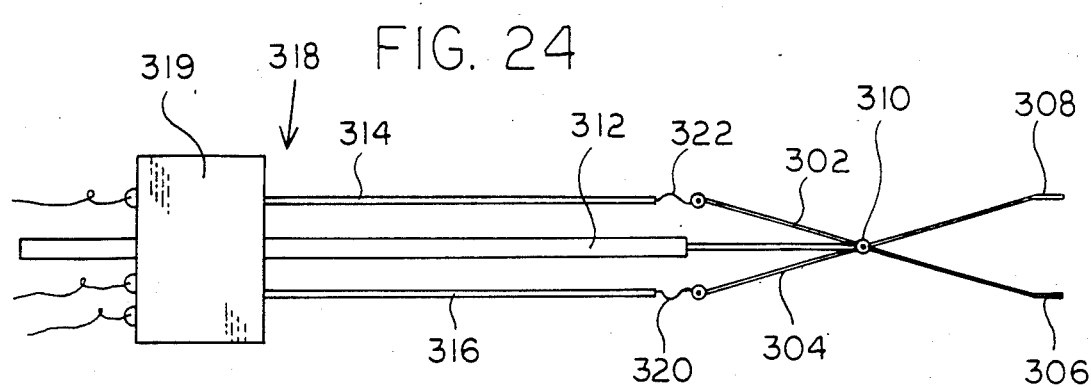
FIGS. 24 and 25 show yet another alternative embodiment of the invention, FIG. 24 being a top plan view and FIG. 25 being a view in side elevation.
Figure 25:
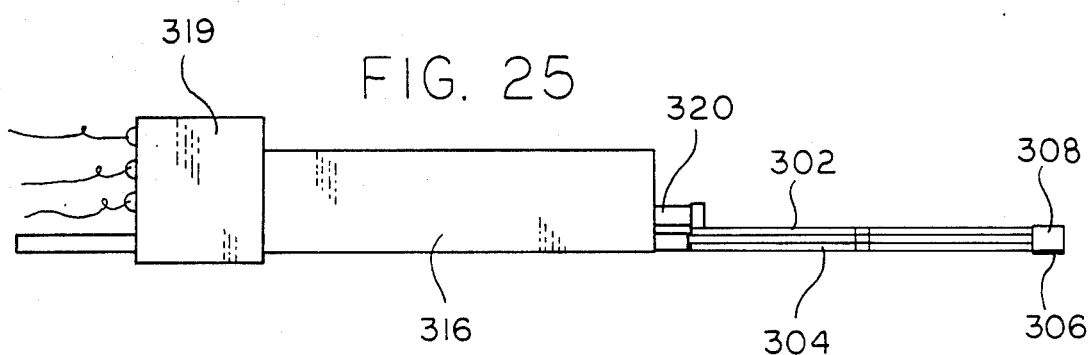

FIGS. 24 and 25 illustrate still another alternative embodiment of the invention. Like the other embodiments, it has a pair of levers 302 and 304 which include respectively jaw portions 306 and 308. The levers 302 and 304 are relatively pivoted to each other and to a support beam 312 at a fulcrum 310.

The laminated flexible sheet which actuates the levers 302 and 304 comprises a pair of flexible sheet cantilevers 314 and 316 formed of the composite laminated sheet material previously described. These cantilevers are mounted at one end of each to a mounting structure 318 for example in the manner illustrated in connection with the embodiment of FIGS. 1 and 2.

The cantilevers 314 and 316 extend generally parallel to the axis of the levers which lie along the support beam 312. Each cantilever is linked to a different one of the levers 302 and 304. Since the ends of the cantilevers 314 and 316 move along arcs which are curved oppositely from the arc along which the associated ends of the levers 302 and 304 move, a linkage must be used in this embodiment which can move the levers and yet permit the ends of the levers 302 and 304 to move relatively away from the proximal ends of the cantilevers 314 and 316 as the levers pivot. We prefer to utilize a simple flexible band to link the ends of the cantilevers to the ends of the levers. For example, the flexible band 320 links cantilever 316 to lever 304 while the flexible band 322 links the end of cantilever 314 to the end of the lever 302. The flexible bands are sufficiently long and have sufficient slack that they can pull the levers apart or permit them to come together to the position illustrated in FIG. 24. As an alternative, of course, the cantilevers can extend beyond the ends of the levers 302 and 304 and the ends of the levers can be provided with a bearing surface so that the cantilevers can merely push against the side of the bearing surface to move the levers in one direction. The levers are biased in the opposite direction.

Figure 26:
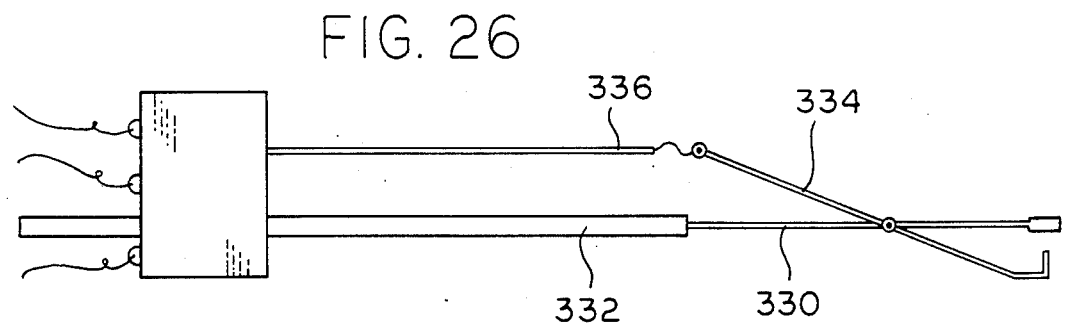
FIGS. 26 and 27 illustrate yet another alternative embodiment of the invention, FIG. 26 being a top plan view and FIG. 27 being a view in side elevation.
Figure 27:
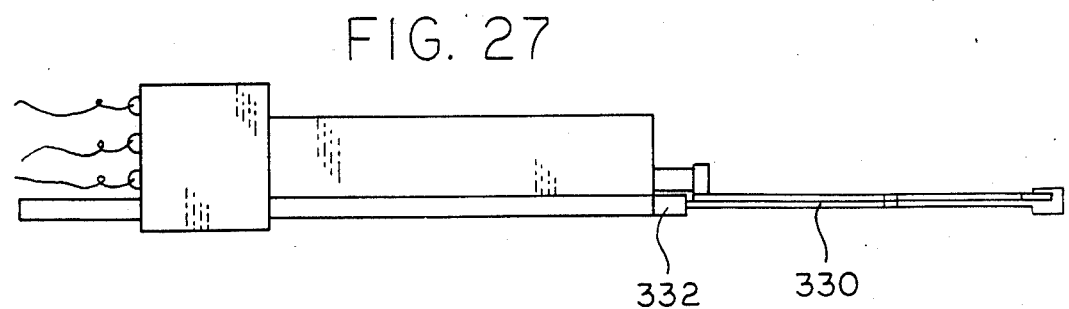

FIGS. 26 and 27 illustrate yet another embodiment similar to the embodiment of FIGS. 24 and 25, except that one of the lever arms 330 is rigidly fixed to the support beam 332 and remains relatively stationary. The other lever 334 is attached to a cantilever 336 of the composite flexible sheet material described above and actuates the lever 334 in the same manner as illustrated in connection with the embodiment of FIGS. 24 and 25.

Figure 28:
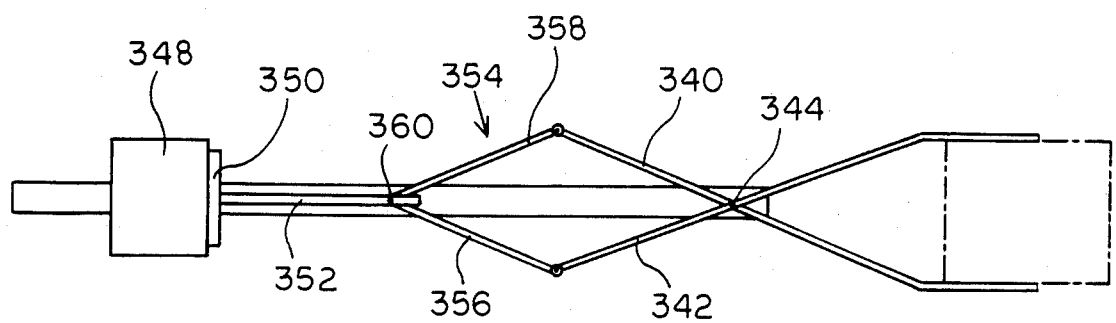
FIGS. 28 through 30 illustrate still another alternative embodiment of the invention with FIGS. 28 and 29 being top plan views, FIG. 28 showing the gripping position and FIG. 29 the release position and FIG. 30 being a view in side elevation in the gripping position.
Figure 29:
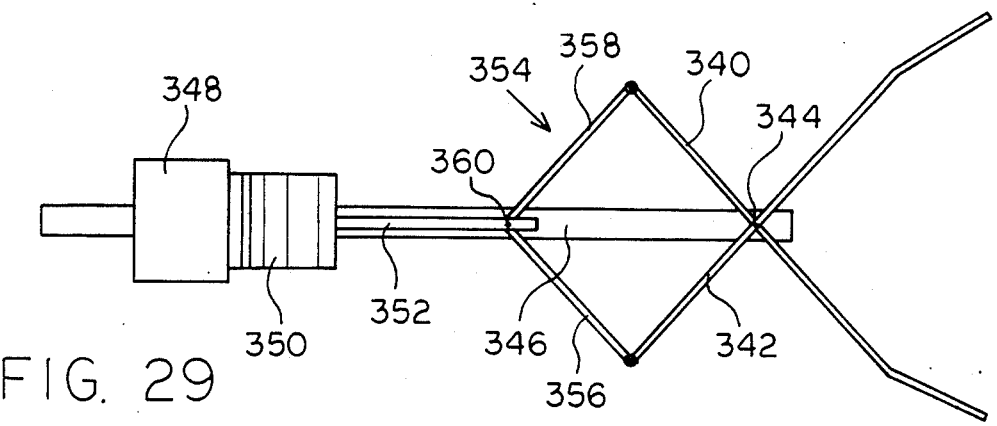
Figure 30:
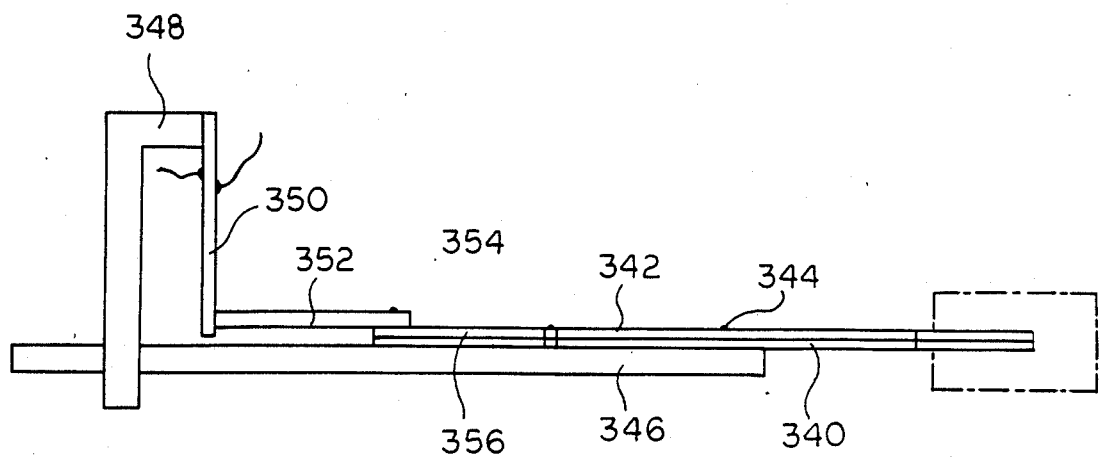

FIGS. 28, 29 and 30 illustrate yet another alternative embodiment of the invention in which a push rod and linkage mechanism is drivingly linked to the composite flexible sheet to actuate the levers. The embodiment of FIGS. 28–30 has levers 340 and 342 which are pivoted about a fulcrum 344 and which are also pivotally connected to a relatively stationary support beam 346.

A support bracket 348 is fixed to the support beam 346 and supports one end of a cantilever 350 of composite flexible sheet material constructed in accordance with the present invention. Thus, the cantilever of flexible sheet material 350 is fixed at one end relative to the support beam 346 through the intermediate bracket 348. The cantilever 350 extends generally transversely to the axis of the levers, which extends generally parallel to the support beam 346. In this manner, the free end of the cantilever 350 may be deflected toward and away from the levers 340 and 342 by the application of the electric field as described above. The cantilever 350 is connected at its opposite end to a push rod 352 which in turn is connected to linkage means 354, which in turn is connected to the levers 340 and 342. The linkage means 354 converts the substantially linear translation induced in the push rod 352 by the deflection of the cantilever 350 to relative pivotal rotation of the levers 340 and 342.

Preferably, the linkage means 354 comprises a simple pair of links 356 and 358, each of which is pivotally connected at one end to the push rod 352 at pivot 360 and is pivotally connected at its opposite end to a different one of the levers 340 and 342.

In the operation of the embodiment of FIGS. 28–30 the composite laminated sheet in the form of the cantilever 350 is shown in its gripping position as illustrated in FIG. 28. When distorted by the appropriate application of the electric field as described above, the lower end of the cantilever 350 moves toward the levers 340 and 342 to push the push rod 352 and open the jaws of the levers 340 and 342 to move them to the position illustrated in FIG. 29. it shuld be apparent, however, that the cantilever 350 may be constructed to deflect in the opposite direction and may be preconfigured and biased in the manner described.

As described above in connection with the embodiments of FIGS. 1–7, the embodiments of all the figures may also have a variety of tool members or tips which may be interchangeably mounted to the jaw members. In addition, multiple duplicates of embodiments of the invention may be aligned side by side along the axis of a fulcrum to provide for the simultaneous parallel operation of numerous piezoelectric polymer composite sheets in accordance with the present invention. Their corresponding jaw members may be joined to form a large jaw member which can grasp an object with the additive force of all the composite sheets.

While certain preferred embodiments of the present invention have been disclosed in detail, it is to be understood that various modifications in its structure may be adopted without departing from the spirit of the invention or scope of the following claims.

I claim:

1. An apparatus for grasping and releasing an object, the apparatus comprising:
    (a) at least two levers each relatively pivotable about a fulcrum and having cooperating jaw portions, a lever arm of at least one lever being movable relatively nearer and farther from the other jaw portion for grasping and releasing an object;
    (b) a laminated, flexible sheet comprising at least two flexible layers which are bonded together, at least one of said layers being a piezoelectric polymer layer, said laminated sheet being drivingly linked to said levers for moving the jaw portions with respect to each other; and
    (c) means for applying an electric field through said polymer layer.

2. An apparatus in accordance with claim 1 wherein both of said layers are piezoelectric polymer layers.

3. An apparatus in accordance with claim 2 wherein said piezoelectric polymer layers are oppositely polarized.

4. An apparatus in accordance with claim 3 wherein said means for applying an electric field through the polymer layers includes a pair of electrically conductive, flexible films bonded to each oppositely facing exterior surface of the laminated sheet and electrically insulated from each other to form a composite sheet and a variable DC voltage source which is controllably connected to the conductive films.

5. An apparatus in accordance with claim 1 or claim 4 wherein said laminated flexible sheet is connected to and extends directly between said two levers.

6. An apparatus in accordance with claim 5 wherein said sheet is trapezoidally shaped.

7. An apparatus in accordance with claim 5 wherein said jaw portions and said laminated flexible sheet are on opposite sides of the fulcrum.

8. An apparatus in accordance with claim 5 wherein said jaw portions and said laminated flexible sheet are on the same side of the fulcrum.

9. An apparatus in accordance with claim 5 wherein one of said levers is stationary.

10. An apparatus in accordance with claim 5 wherein said laminated flexible sheet is formed substantially in an arcuate shape.

11. An apparatus in accordance with claim 5 wherein each of said levers is pivoted on a different fulcrum.

12. An apparatus in accordance with claim 1 or claim 4 wherein a relatively stationary support is pivotally connected to said levers and wherein said laminated flexible sheet comprises a first laminated sheet connected to and extending between said support and one of the levers and a second laminated sheet connected to and extending between said support and the other lever.

13. An apparatus in accordance with claim 12 wherein said laminated flexible sheet comprises a plurality of laminated sheets connected to and extending between said support and one of the levers and a plurality of laminated sheets connected to and extending between said support and the other lever.

14. An apparatus in accordance with claim 1 or claim 4 wherein a relative stationary support beam is pivotally connected to said levers at the fulcrum of each lever and wherein said laminated flexible sheet comprises at least two flexible sheet cantilevers which are mounted at an end of each to said support beam and which extend generally parallel to the axis of said levers, the opposite end of each cantilever being linked to a different one of said levers.

15. An apparatus in accordance with claim 14 wherein each of said cantilevers is linked to its associated lever by means of a flexible band.

16. An apparatus in accordance with claim 1 or claim 4 wherein a first one of said levers is relatively stationary and wherein said laminated flexible sheet comprises a cantilever which is fixed at one end with respect to the relatively stationary lever and extends generally parallel to the axis of said levers and is linked at its opposite end to the second lever.

17. An apparatus in accordance with claim 16 wherein said cantilever is connected to said second lever by means of a flexible band.

18. An apparatus in accordance with claim 1 or claim 4 wherein a relatively stationary support beam is pivotally connected to said levers and wherein said laminated, flexible sheet comprises at least one cantilever which is fixed at one end with respect to said support beam and extends generally transverse to the axis of said levers, for being deflected toward and away from the levers, said cantilever connected at its opposite end to a push rod which extends generally parallel to the axis of said levers and is connected to linkage means connected to said levers for converting the substantially linear translation of the push rod to relative pivotal rotation of the levers.

19. An apparatus in accordance with claim 18 wherein said linkage means comprises a pair of links, each pivotally connected at their opposite ends to a different one of said levers.

* * * * *